(12) United States Patent
Panasik et al.

(10) Patent No.: US 6,643,278 B1
(45) Date of Patent: Nov. 4, 2003

(54) WIRELESS NETWORK CIRCUITS, SYSTEMS, AND METHODS FOR FREQUENCY HOPPING WITH REDUCED PACKET INTERFERENCE

(75) Inventors: Carl M. Panasik, Garland, TX (US); Thomas M. Siep, Garland, TX (US)

(73) Assignee: Texas Instruments Incorporated, Dallas, TX (US)

( * ) Notice: Subject to any disclaimer, the term of this patent is extended or adjusted under 35 U.S.C. 154(b) by 0 days.

(21) Appl. No.: 09/473,337

(22) Filed: Dec. 28, 1999

Related U.S. Application Data

(60) Provisional application No. 60/125,573, filed on Mar. 23, 1999.

(51) Int. Cl.[7] .................................................. H04Q 7/00
(52) U.S. Cl. ................................... 370/330; 370/344
(58) Field of Search .................................. 370/330, 480, 370/342, 441, 442, 241, 252, 254, 389, 392, 465, 394, 344, 345; 375/130, 131, 132–134; 380/49, 9, 48, 59; 455/422, 436

(56) References Cited

U.S. PATENT DOCUMENTS

| | | | | |
|---|---|---|---|---|
| 4,716,573 A | | 12/1987 | Bergström et al. | |
| 5,506,863 A | * | 4/1996 | Meidan et al. | 375/134 |
| 5,528,622 A | | 6/1996 | Cadd et al. | |
| 5,778,075 A | * | 7/1998 | Haartsen | 375/138 |
| 5,809,059 A | | 9/1998 | Souissi et al. | |

* cited by examiner

*Primary Examiner*—Dang Ton
(74) *Attorney, Agent, or Firm*—Ronald O. Neerings; Wade James Brady, III; Frederick J. Telecky, Jr.

(57) ABSTRACT

A method (10) for determining a frequency hopping sequence for a newly-entering network. The method comprises the step of scanning (16) a plurality of frequency channels. For each of the plurality of frequency channels, the scanning step comprises detecting whether a signal (18, 22) exists on the channel and recording information (20, 24) corresponding to each channel on which a signal is detected. Finally, and responsive to the recorded information, the method forms (30) the frequency hopping sequence.

25 Claims, 2 Drawing Sheets

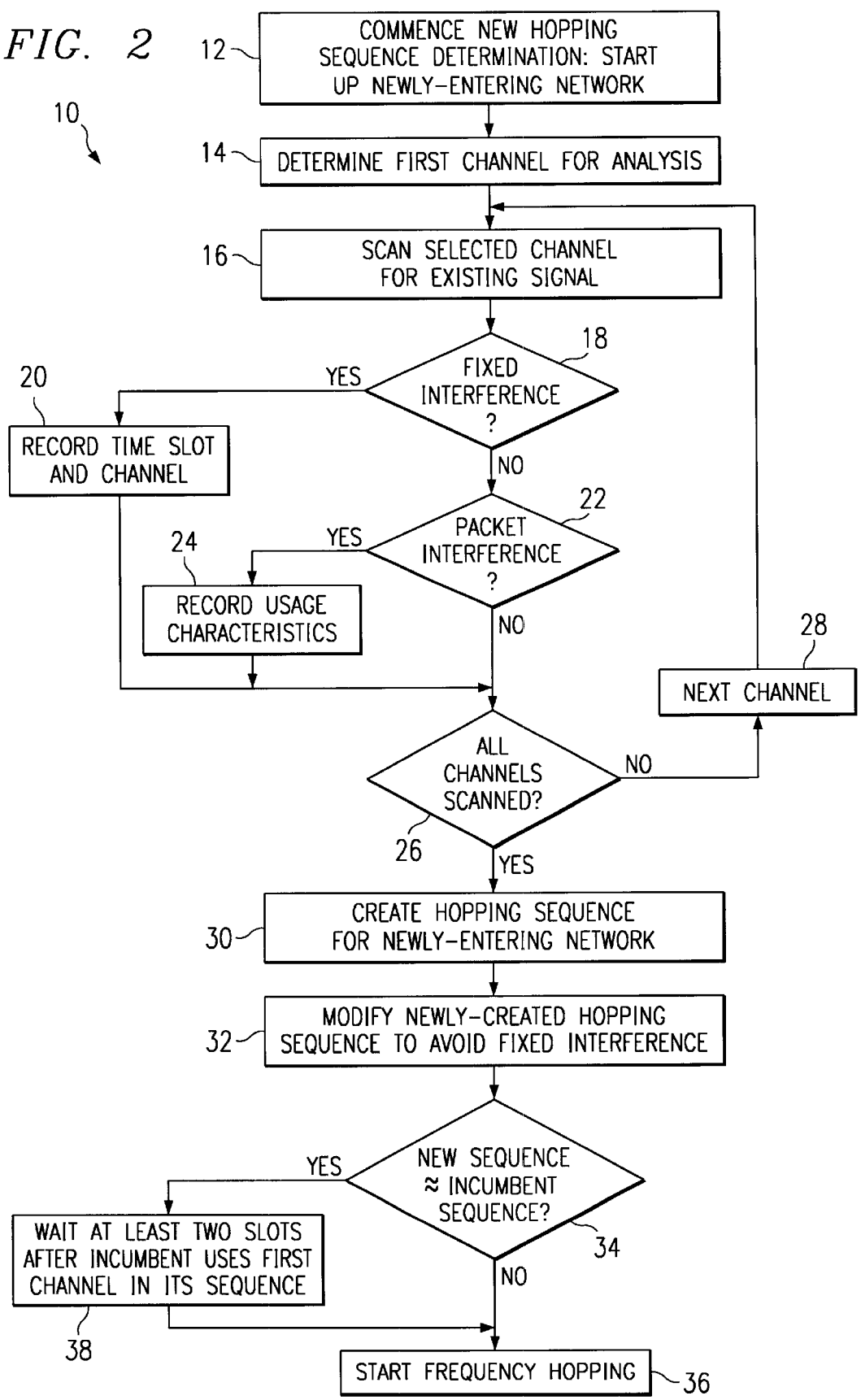

WIRELESS NETWORK CIRCUITS, SYSTEMS, AND METHODS FOR FREQUENCY HOPPING WITH REDUCED PACKET INTERFERENCE

This application claims the benefit of Provisional Application Ser. No. 60/125,573 filed Mar. 23, 1999.

CROSS-REFERENCES TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

The present embodiments relate to wireless communication systems, and are more particularly directed to such systems using frequency hopping.

Wireless networks are becoming increasingly popular, and in this regard there has been improvement in many aspects of such networks. Some improvements relate to configurations that permit simultaneously operation of different networks where there is minimal or no interference between communications belonging to each of the networks. In this respect, the term network is used, and is further used in the same manner for the remainder of this document, to describe a system consisting of an organized group of intercommunicating devices. Further in this respect, the different networks may be labeled according to a first network that is already transmitting in time followed by a second network in time seeking to transmit and thereby possibly communicating and causing interference due to a communication overlapping the pre-existing communication of the first network. Accordingly, to facilitate the remaining discussion, such a first network is referred to as an incumbent network, while the network which seeks to communicate, or in fact does communicate, after the incumbent network is referred to as the newly-entering network. Given this terminology, the present background and embodiments discussed below are directed to reducing interference between incumbent network communications and newly-entering network communications.

One approach to reducing the above-introduced interference is known in the art as spread spectrum frequency hopping and is sometimes referred to more simply as frequency hopping. In frequency hopping, a newly-entering network transmitter transmits packets of information at different frequencies in an effort to reduce the chance that the packet will interfere or "collide" with a packet transmitted at a frequency by a transmitter in an incumbent network. The change between frequencies, that is, from one frequency to another, is said to be a "hop" between the frequencies. Moreover, the goal is such that each packet from a newly-entering network is transmitted at a frequency which neither overlaps nor is near enough to a frequency at which an incumbent network is transmitting. Further in this regard, some systems (e.g., using Bluetooth protocol) transmit each successive packet at a different frequency, that is, the transmitter is "hopping" to a different frequency for each packet. Alternatively, others systems (e.g., IEEE 802.11) transmit a first set of packets at a first frequency, and then hop to a second frequency to transmit a second set of packets, and so forth for numerous different sets of packets at numerous different respective frequencies. Note further that if interference or a collision does occur, it typically corrupts the data of both packets, that is, the data transmitted by both the newly-entering network and the incumbent network. As a result, both networks are then required to re-transmit the packets an additional time so as to replace the corrupted data resulting from the collision.

In an effort to achieve minimal packet collision using frequency hopping, two prior art methods have arisen for determining the different frequencies to which a network will hop. In a first method, a frequency hopping network uses a pre-ordained hopping sequence. This first approach is used by way of example under the IEEE 802.11 standard. In a second method, a seed is provided to a pseudo-random generator which produces a corresponding pseudo-random series of frequencies along which the network hops. This second approach is used by way of example under the fairly recently developed Bluetooth protocol. Both of these approaches have achieved some level of success in reducing the amount of inter-network packet collision. Nevertheless, the present inventors have empirically determined that by locating two or more different networks in the same vicinity such that transmissions from each different network effectively compete for airtime, there still arises a considerable amount of packet collisions, thereby reducing the effective transmission rate for each network.

Frequency hopping as described thus far reduces the chances of interference between a packet from newly-entering network and a packet from an incumbent network. Further in this regard and by way of additional background, FIG. 1 illustrates communications of such packets and, as detailed below, it also illustrates instances where packet collisions occur. Looking to FIG. 1 in greater detail, its horizontal axis illustrates time (or time slots), and its vertical axis indicates frequency. Additionally, FIG. 1 illustrates a number of blocks, where each block is intended to depict a packet as transmitted by either an incumbent network or a newly-entering network. Further in this regard, note that the term "packet" is used in this document to define a block of information sent in a finite period of time, where subsequent such packets are sent at other times. This block of information may take on various forms, and sometimes includes different information types such as a preamble or other type of control information, followed by user information which is sometimes also referred to as user data. Further, the overall packet also may be referred to in the art by other names, such as a frame, and thus these other information blocks are also intended as included within the term "packet" for purposes of defining the present inventive scope. In any event, returning to FIG. 1, for the sake of reference, each packet illustrated in FIG. 1 is labeled with an identifier using the letter "P" (i.e., for packet) and following after that letter is a number corresponding to the network which transmitted the packet. More particularly, packets transmitted by the first network (i.e., the incumbent network) are labeled with an identifier P1 while packets transmitted by the second network (i.e., the newly-entering network) are labeled with an identifier P2. Further, the subscript for each packet identifies a time period encompassed by the duration of the packet. For example, during a time to, the first network transmits a packet $P1_0$ while also during time $t_0$ the second network transmits a packet $P2_0$. Further in this regard, in the prior art transmissions by the first network are asynchronous with respect to transmissions of the second network, both in start time and periodicity. Thus, time $t_0$ is only meant as a relative indication for the first packet from each network, and it is not intended to suggest that the packets from both networks begin and end at the same time.

With respect to all packets in FIG. 1, the preceding demonstrates that each packet begins at a certain time, ends at a later time, and fills a certain frequency range (where the range is referred to as a channel). As a result and as described below, interference may occur if the area in FIG. 1 defined by a packet overlaps or is within a certain distance of a packet from another wireless link. Indeed and as discussed below, such interference may occur in one of four different ways.

Time $t_1$ in FIG. 1 illustrates a first type of packet interference, where it may be seen that the first network transmits a packet $P1_1$ After packet $P1_1$ commences but also during time $t_1$ the second network transmits a packet $P2_1$. The overlap of packets $P1_1$ and $P2_1$ is shown as a first collision $C_1$. Note that the horizontal alignment of packets $P1_1$ and $P2_1$ graphically indicates that in the example of collision $C_1$, both packets occupy the same frequency channel. Thus, collision $C_1$ represents an example where two different networks attempt to transmit packets during an overlapping time period and along the same channel.

Before proceeding with other types of packet collisions, an additional discussion is noteworthy with respect to a methodology which has been used to further reduce the likelihood and impact of packet collisions such as collision $C_1$. More particularly, this additional methodology is referred to in the art as listen-before-talk ("LBT"). In an LBT system, the system uses the hopping sequence described above, but prior to transmitting along a channel in the sequence the system monitors (or "listens") at the channel to determine if there is another packet already occupying that channel during the current time. Returning to packet $P1_1$ by way of example, if the second network employed LBT, then it would listen at the desired channel at which it intended to transmit $P2_1$ and would therefore detect the presence of packet $P1_1$. As a result, the second network would avoid collision C1 by not transmitting packet $P2_1$ at the desired frequency, but instead it would delay a random period and then proceed to the next designated channel of its hopping sequence. Next, the second network would listen at that next designated channel to again determine if that channel was occupied by a packet from another network, and if no packet was detected then the second network would transmit its packet; however, if this next designated channel also was occupied, then the second network would continue to examine additional channels in this same manner until a channel was detected without being occupied by a packet from another network, at which time the second network would transmit its packet along the now unoccupied channel. Given this process, however, note that a delay arises in LBT systems, where the amount of delay depends on the number of times that the LBT network is forced to listen, detect, and advance from an occupied channel, and then delay an additional random period to listen, detect, and transmit along an unoccupied channel.

While LBT as shown above reduces the possibility of collisions, it also has drawbacks. For example, LBT delays transmission by the network which was prepared to transmit along a channel but was prevented from doing so due to an already-transmitted packet in the desired channel. As another example, it adds an element of delay to each packet due to its listening aspect. Also, all the devices in an environment must utilize LBT to gain the most benefit (fairness) of the scheme. As still another example, some protocols (e.g., Bluetooth) utilized in the unlicensed bands do not support LBT, while such protocols may nonetheless provide other beneficial aspects and, thus, the choice to use such a protocol is a tradeoff in that other aspects are obtained without the availability of LBT.

Time $t_2$ in FIG. 1 illustrates a second type of packet interference in connection with a collision $C_2$ occurring between a first network packet $P1_2$ and a second network packet $P2_2$. For collision $C_2$, the incumbent first network transmits packet $P1_2$ during a period including time $t_2$ and at a first channel, and thereafter the second network transmits packet $P2_2$ also during a period including time $t_2$ (i.e., the periods of the packets overlap). Packet $P2_2$ is transmitted at a second channel which, while different than the channel of packet $P1_2$, it is immediately adjacent the channel occupied by packet $P1_2$. Further in this regard, it is known in the art that while packets occupy a certain channel as shown by the vertical displacement of a packet in FIG. 1, there is an additional tendency for a packet to provide slight interference or "splatter" into adjacent frequency channels. As a result of this effect, even though packets $P1_2$ and $P2_2$ occupy different channels, they are still in adjacent channels and, thus, they are close enough to one another in frequency such that the splatter effect causes a collision between the packets. Indeed, in some networks the filters used are relatively inexpensive and, as a result, the concept illustrated with packets $P1_2$ and $P2_2$ may also apply to next-adjacent channels, that is, to the channels that are one more channel away from the channels adjacent to the channel in which a packet is transmitted. Thus, collision $C_2$ represents an example where two different networks attempt to transmit packets during an overlapping time period and along adjacent (or next-adjacent) frequency channels. Here, if neither network uses LBT, then both packets $P1_2$ and $P2_2$ will require retransmission due to the collision. If, however, the network that intended to transmit the second packet of the two uses LBT, then note first that LBT mechanisms are less likely to correctly discern an adjacent channel collision. However, if the LBT mechanism does recognize the potential adjacent channel collision, then the second packet is not transmitted along the channel represented by $P2_2$ and instead that packet is delayed. This delay, while diminishing the effective transmission of the second network, avoids any disturbance to the first already-existing packet. In the example of time $t_2$, therefore, if the second network uses LBT, then packet $P1_2$ will not be disturbed because the second network will move the transmission of packet $P2_2$ to a different channel.

Time $t_4$ in FIG. 1 illustrates a third type of packet interference in connection with a collision $C_4$, which is comparable to collision $C_2$ except that for collision $C_4$ the networks transmit in opposite order. More particularly, for collision $C_4$, the second network first transmits a packet $P2_4$ and, thereafter, the first network transmits a packet $P1_4$. The duration of both of these packets overlaps time $t_4$, and again their channels are adjacent to one another rather than being the same channel. Nonetheless, the splatter effect again causes sufficient reach of each packet into the adjacent channel such that a collision occurs. Here, if neither network uses LBT, then both packets $P2_4$ and $P1_4$ require re-transmission due to the collision; if, however, the network transmitting the second packet in time (i.e., $P1_4$) of the two which would otherwise collide uses LBT, then only that packet is delayed and the first already-existing packet (i.e., $P2_4$) is not disturbed.

Time $t_7$ in FIG. 1 illustrates a fourth type of packet interference in connection with a collision $C_7$, which is comparable to collision $C_1$ except that for collision $C_7$ the networks transmit in opposite order. More particularly, for collision $C_7$, the second network first transmits a packet $P2_7$ and, thereafter, the first network transmits a packet $P1_7$. The duration of both of these packets overlap time $t_7$ and their channels are the same. As a result, collision $C_7$ occurs (assuming the last network to transmit, which here is the first network, does not use LBT).

FIG. 1 illustrates an additional type of potential interference by depicting a band of fixed interference FI. Fixed interference FI is intended to represent a non-network source of radio frequency transmission that remains at the same frequency for numerous time slots. Such fixed interference may arise from various devices, such as a leaking microwave oven by way of example. In any event, note at time $t_5$ that the second network transmits a packet $P2_5$, and the channel along which that packet is transmitted overlaps fixed interference FI. As a result, fixed interference FI interferes with packet $P2_5$, thereby requiring it to be re-transmitted. Once more, however, if the second network were to implement LBT, then assuming fixed interference FI were detected during the listening operation of the LBT, then packet $P2_5$ would not be transmitted so as to avoid the otherwise imminent interference. Lastly, while the example of packet $P2_5$ demonstrates a data collision where the packet uses the same channel as the fixed interference, note further that fixed interference also may disturb packets in a channel that is adjacent to the channel including the fixed interference. Once more, because some networks use relatively inexpensive filters, the fixed interference may corrupt packets which are either in a channel which is immediately adjacent to the fixed interference or which are in the next-adjacent channel (i.e., a channel which is next to the channel that is immediately adjacent to the fixed interference).

In view of the above, one skilled in the art should appreciate there are various opportunities for packet collision or packet interference to occur. Indeed, referring to FIG. 1, the examples above demonstrate that an area may be described around each packet, where the packet is disturbed if another packet occurs within that area. Thus, this area, which may be perceived as a window or zone around the packet, is not only defined by the dimensions of the packet, but extends both before and after the packet by the width of another potentially-interfering packet, and extends above and below the packet channel through the height of at least the adjacent channel above and below the packet frequency channel. Still further, note that the packet sizes for both networks shown in FIG. 1 are the same size by way of example; however, in some contexts, an incumbent network may use packets of different dimension (i.e., either in frequency and/or time) relative to the newly-entering network. In these cases, the packet size for the incumbent as well as the packet size for the newly-entering network, in addition to the window-affecting factors described above, all further define a two-dimensional area relative to a newly-entering packet in which interference may occur. Given the size of the two-dimensional area, therefore, there remains a possibility of packet disturbance even given the pseudo random nature of hopping spread spectrum RF communications.

As an additional consideration relative to avoiding packet collisions, it is further noted that the Federal Communications Commission ("FCC") imposes a restriction on the art in the Industrial Scientific Medical ("ISM") bands. Specifically, the FCC explicitly forbids independent networks to expressly cooperate in allocation of the wireless medium.

In view of the above, there arises a need to reduce the possibility of packet collision and interference, and preferably to do so in a manner that may be used with protocols that do not support LBT. The preferred embodiment addresses these goals, as is explored below. In addition, there arises a need to achieve the above goals while complying the with the above-described FCC requirements. The preferred embodiments described below avoid these requirements by not requiring the newly entering network to have knowledge of or cooperation with the incumbent network.

BRIEF SUMMARY OF THE INVENTION

In the preferred embodiment, there is a method for determining a frequency hopping sequence for a newly-entering network. The method comprises the step of scanning a plurality of frequency channels. For each of the plurality of frequency channels, the scanning step comprises detecting whether a signal exists on the channel and recording information corresponding to each channel on which a signal is detected. Finally, and responsive to the recorded information, the method forms the frequency hopping sequence. Other circuits, systems, and methods are also disclosed and claimed.

BRIEF DESCRIPTION OF THE SEVERAL VIEWS OF THE DRAWING

FIG. 2 illustrates a flow chart of the preferred embodiment as implemented in a method performed by a network transceiver.

DETAILED DESCRIPTION OF THE INVENTION

Figure 1:
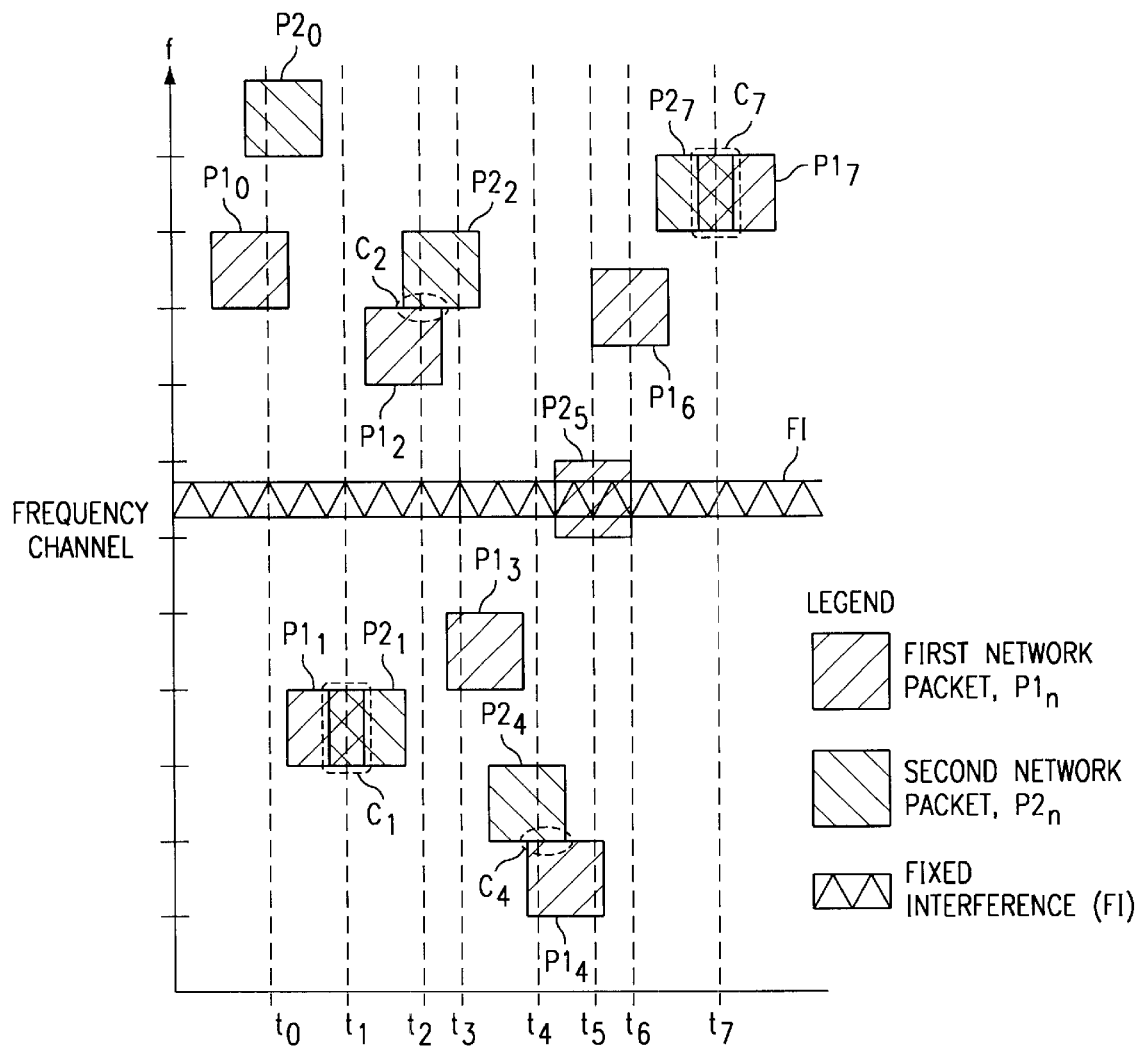
FIG. 1 illustrates various packets transmitted by a first and second network and demonstrates potential collisions between such packets as well as interference from a band of fixed interference.

FIG. 1 was described in the Background Of The Invention section of this document and the reader is assumed familiar with that description.

FIG. 2 illustrates a flow chart of a method 10 according to the preferred embodiment and for operating a wireless network so as to reduce the drawbacks described above in connection with the prior art. By way of introduction to this preferred embodiment, the following discussion demonstrates that by the conclusion of method 10 an improved hopping sequence is generated for a wireless network. The hopping sequence is improved in two respects. First, the hopping sequence is such that packets may be communicated according to it and results in a reduced amount of packet collisions as compared to a prior art non-LBT wireless frequency hopping system. Second, the hopping sequence is such that packets may be communicated according to it and results in a reduced incidence of conflict with fixed interference as compared to a prior art non-LBT wireless frequency hopping system. These benefits are illustrated in greater detail after the following detailed discussion of method 10. Finally, it should be noted that method 10 may be implemented in connection with various types of wireless networks as may be ascertained by one skilled in the art and as further addressed later. Additionally, such a person also may determine various different circuits and software implementations given the selected network, as is also explored later by way of example.

Method 10 begins with a step 12 where the wireless network begins the determination of a new hopping sequence to be used for intercommunications on the network (i.e., by all transmitters, receivers, and transceivers in the network). To facilitate the remaining discussion, the network which will use this new hopping sequence is referred to as the newly-entering network. This terminology is chosen because the newly-entering network's communications are new with respect to any one or more incumbent networks that already may be communicating along the frequency band to be used by the newly-entering network. In the preferred embodiment, step 12 occurs at network start-up, such as when a first transceiver of the newly-entering network is turned on or is otherwise initialized. Next, method 10 continues to step 14.

In step 14, a first frequency channel is selected for analysis. More particularly and as will become apparent given the remaining discussion of method 10, in the preferred embodiment each channel along which the newly-entering network may transmit is individually analyzed by method 10 at least once. Accordingly, step 14 operates so that a first one of these channels is selected to be analyzed. This selection may be implemented in various fashions, such as by assigning a unique and ascending number to each increasing frequency channel which is available to the newly-entering network, and then step 14 may operate by initializing a counter to the first assigned number. Other implementations may be ascertained by one skilled in the art. In any event, once a first channel is selected for analysis, method 10 continues to step 16.

In step 16, the channel selected by step 14 is scanned to determine if there is an existing signal in that channel. In the preferred embodiment, the known receive signal strength indicator ("RSSI") is used as the scan technique. Note that an existing signal may be detected in the scanned channel due to various events as illustrated earlier in connection with FIG. 1. For example, an existing signal will be detected in step 16 if there is fixed interference in the scanned channel (or in a channel one or two adjacent channel locations from the scanned channel). As another example, an existing signal will be detected in step 16 if another network has transmitted a packet that, during the duration of the scan, is either in the scanned channel or in a channel that is adjacent the scanned channel. Each of these possibilities is responded to by one or more additional steps, as discussed below. Following the scan of step 16, method 10 continues to step 18.

Step 18 directs the flow of method 10 if the interference, if any, detected in step 16 is fixed interference. The determination of whether a particular detected interference is fixed interference (as opposed to packet interference) may be made in various fashions. A simple approach is to wait on an occupied channel for a period of time which exceeds all known packet lengths (0.4 seconds by FCC part 15 rules). In a faster and preferred approach, the instance of a fixed interferer is determined by determining its occupied bandwidth, which is very small relative to data carrying modulated signals. More particularly, many scan circuits are available which can be configured according to the preferred embodiment to determine the bandwidth of a received signal by stepping through several sub-channels of the particular channel. In the process, the scanning circuit collects the RSSI as a function of each sub-channel and determines the half-power points, which is the bandwidth. Thus, once all sub-channels for the scanned channel are evaluated, and assuming that interference is detected on at least one of those sub-channels, then it may be further determined that the interference is fixed interference based on the bandwidth identified across all sub-channels. Specifically, fixed interference typically occupies only ten percent or less of the entire channel bandwidth; thus, if ten same-sized sub-channels are scanned for a given evaluated channel, and if the interference detected is only in one or two of those sub-channels, then the preferred embodiment determines that the detected interference is fixed interference; to the contrary, if interference is detected across most or all of those sub-channels, then the preferred embodiment determines that the detected interference is packet interference. In any event, if fixed interference is detected, then step 18 directs the flow to a step 20. To the contrary, if either no interference is detected, or if interference which is not fixed interference is detected, then method 10 continues from step 18 to step 22. Each of these alternative paths is described below.

In step 20, having been reached due to the detection of fixed interference existing in the scanned channel, method 10 records an indication of the time slot and channel in which the fixed interference was detected. The use of this information is detailed later. Thereafter, method 10 continues from step 20 to step 26, which is discussed following the discussion below concerning steps 22 and 24.

Step 22 directs the flow of method 10 if the potential interference, if any, detected in step 16 is interference from another packet being transmitted in the same, or an adjacent, channel as the channel scanned in step 16. In the preferred embodiment, the determination of whether a particular detected interference is packet interference (as opposed to fixed interference) is again made by measuring bandwidth which may then be compared with the known packet bandwidth, such as in connection with the sub-channel evaluation described above. If packet interference is detected in the scanned channel, then step 22 directs the flow to a step 24. To the contrary, if no interference was detected and step 22 is reached, then method 10 continues from step 22 to step 28. Each of these alternative paths is described below.

In step 24, the usage characteristics of the packet interference of the scanned channel are recorded. These characteristics preferably include the time slot and channel in which the packet was detected. In addition, when a potentially-interfering packet is detected in the scanned channel, there are two possible levels of information retrieval from that packet. As a first possibility, if the packet is detected in time to properly recover the header information from the packet, then that header information should include an indication of the hopping sequence of the incumbent network which transmitted the packet. For example, this indication may be by way of a seed which is used by the incumbent network which transmitted the packet and, more particularly, which is applied to a random sequence generator of the network to generate the incumbent network's frequency hopping sequence. In any event, the indication is stored by step 24 as a usage characteristic. As a second possibility, if the packet is not detected in time to properly recover its header information, then preferably a record is made of the time slot and frequency channel in which the packet was detected. Further in this regard, note that there is the chance that the existence of packet data in the scanned channel is detected, yet the actual data is relatively unintelligible. For example, if the incumbent system is not interoperable with the newly-entering system, then there is the possibility that the actual data from the incumbent's packet cannot be ascertained. However, even in this event, preferably the usage characteristics that are ascertained still include the time slot and frequency channel in which the packet was detected, and these characteristics are therefore preferably stored by step 24. Next, method 10 continues from step 24 to step 26.

The preceding demonstrates that step 26 may be reached when either fixed interference has been detected in the scanned (or an adjacent) channel, or when packet interference has been detected in the scanned (or an adjacent) channel, or indeed when no interference has been detected in the scanned channel. In all events, step 26 determines whether all channels that are available to the newly-entering network have been scanned. For example, in a contemporary 2.4 GHz ISM band wireless network, there are a minimum of 75 (of 83) required channels within the allowable ISM band. The incumbent transceiver produces between 2 and 1600 hops per second. Accordingly, applying step 26 to an ISM-based system will determine whether all 83 channels have been scanned. If not, method 10 continues to step 28 while, if all channels (from 75 to 83 in number) have been scanned, then method 10 proceeds to step 30.

Step 28 causes method 10 to prepare to repeat the above-described analysis with another channel that has not yet been scanned. This step is implemented in a manner compatible with the approach taken in step 14 to identify a first channel to be scanned. For example, recall that earlier in connection with step 14 an approach was given where a counter was set to correspond to a first channel to be scanned. If this approach is selected, then step 28 may be implemented by incrementing this counter. In any event, once the network is properly prepared to evaluate another channel, method 10 returns from step 28 to step 16 and the above-described options are taken with respect to the next channel.

At some point given the return flow of method 10 described above, step 26 will determine that all channels available for transmission by the newly-entering network have been scanned; as noted above, at this point method 10 reaches step 30. Step 30 determines a hopping sequence for the newly-entering network given the information recorded by any previous occurrences of steps 20 and step 24. In other words, once step 30 is reached, if either or both of fixed or packet interference has been detected, then information has been stored regarding such interference and step 30 derives a favorable hopping sequence from that information. More particularly, given the detected information, step 30 generates a hopping sequence that will thereafter be used for transmission by the newly-entering network. This derived hopping sequence seeks to minimize the possibility that packets sent by the newly-entering network, and according to that hopping sequence, will incur interference given the already-existing interference as detected by earlier occurrences of step 16. In the preferred embodiment, the step 30 derivation of the hopping sequence is based first on determining, if possible, the hopping sequence of the incumbent network from previous information recorded in occurrences of step 24, and also in view of any recorded fixed interference recorded in occurrences of step 20. Thereafter, and as discussed later, the hopping sequence for the newly-entering network is derived. First, therefore, the preferred methods for determining the incumbent network's hopping sequence are described below. Second, the preferred methods for determining the newly-entering network's hopping sequence in view of the incumbent network's hopping sequence are also described below.

A first approach for determining the incumbent network hopping sequence is straightforward if an earlier occurrence of step 24 was able, as described above, to properly recover the header information from a detected incumbent network packet. In other words, recall that the header information includes an indication of the hopping sequence of the incumbent network which transmitted the packet. Thus, if such a header was properly decoded, then step 30 merely derives the incumbent network's hopping sequence from the indication in the packet header.

A second approach for determining the incumbent network's hopping sequence is achieved by extending the duration of step 16 to be large relative to the time that the incumbent network is expected to maintain a transmission along each of its available channels. For example, if the incumbent network is a Bluetooth network, then it is known that it will hop 1600 times a second, where for each hop only one packet is transmitted followed by another hop and packet transmission, and so forth. In addition, a Bluetooth network may hop among 83 different channels. Thus, where the incumbent network is a Bluetooth network, then the duration of step 16 may be set, by way of example, to one second. Given this duration, note that on average, for this one second duration which will therefore include 1600 hops to one of 83 different channels, then each different channel should be used approximately 19.27 times (i.e., 1600/83= 19.27). As a result, during the one second scan duration in a given channel, approximately 19.27 packet detections should occur for that channel, and these detections are stored as the above-mentioned usage characteristics. Still further, this one second duration is then repeated for each different scanned channel, further enhancing the map to demonstrate approximately 19.27 detected packets for each channel scanned, along with the time intervals within the one second duration for different channel usages. Still further in the Bluetooth protocol, the hopping sequence repeats after 1600 hops; accordingly, given the mapped information described above, an accurate determination of the incumbent network's hopping sequence may be derived.

A third approach for determining the incumbent network's hopping sequence is achieved by shortening the duration of step 16 to be short relative to the time that the incumbent network is expected to maintain a transmission along one channel. More particularly, in this third approach each channel is scanned for a short enough duration so that all possibly used channels are scanned in a time period that is no greater than the time period that the incumbent network will continue to transmit along a single channel. Again using the example of an incumbent Bluetooth network, recall that it transmits successive packets along a maximum of 83 different channels. Accordingly, for the third approach the scan duration is equal to (or no greater than) 1/83 times the duration of a packet. By scanning in this manner, for 83 successively scanned channels, where each channel is scanned for only 1/83 of a packet duration, and assuming only a single Bluetooth incumbent network is transmitting, then only one channel during the scan should be found to be occupied by a packet (although adjacent channels may detect interference from the packet splatter). In this approach, note that step 26 of method 10 is modified so that the channels are scanned numerous times rather than just scanning all available channels once, so that eventually method 10 will detect usage in each of the available channels. Once more using the Bluetooth incumbent network by way of example, it is probable that after 1600 scans of each of the 83 channels (where each channel is scanned for 1/83 of the packet duration), then the entire incumbent network hopping sequence should be mapped. This result follows since, during those 1600 scans, each channel will be shown to be used on average 19.27 times, and with the recorded information identifying when each such channel is used a map should result either demonstrating the incumbent network's hopping sequence, or from which the incumbent network's hopping sequence may be ascertained.

Once the incumbent network's hopping sequence is ascertained, such as by using any one of the three above-described preferred methods, then step 30 is completed by selecting a hopping sequence for the newly-entering network. In the preferred embodiment, the selected hopping sequence may be generated in one of two manners. In a first manner, the selected hopping sequence is identical to the incumbent network's hopping sequence for reasons more clear with respect to step 38 discussed below. In a second manner, each channel in the selected hopping sequence is selected so as to avoid the channels in the incumbent network's hopping sequence. In other words, the information ascertained from earlier occurrences of step 24 indicates each channel that is used according to the incumbent network's hopping sequence. Thus, in the second manner, for each time period the incumbent network will have used a channel, and in response to this information the newly-entering network's hopping sequence is created such that a different and non-adjacent channel will be used during that time period. Using either approach, the newly-entering network's hopping sequence has been created, and method 10 then proceeds from step 30 to step 32.

Step 32 modifies the newly-entering network's hopping sequence created in step 30 to avoid any channels detected to have fixed interference (i.e., as recorded in any earlier occurrence of step 20). More particularly, for each channel in the newly-entering network's hopping sequence that corresponds to a frequency in which there is fixed interference, then that channel in the sequence is not used and instead a replacement channel is selected. Further in this regard, note that in the preferred embodiment the replacement channel is selected from a rotation of channels in which there has not been a detection of fixed interference. The rotation also does not include either channels that were used in the previous time slot, or the following time slot, by the newly-entering network. Note that this rotation technique is preferred over using a same single alternative channel because the use of such a single channel may not provide sufficient randomness to satisfy the regulations of the FCC. Following step 32, method 10 continues to step 34.

Step 34 controls the method flow based on which of the two above-described techniques was implemented to choose the newly-entering network's hopping sequence, that is, whether it is the same as the incumbent network's hopping sequence (as modified by step 32) or whether it uses completely different channels than the incumbent network (as also modified by step 32). If the newly-entering network's hopping sequence is completely different, then method 10 continues to step 36 where the newly-entering network begins communicating according to its newly-developed hopping sequence. Alternatively, if the newly-entering network's hopping sequence is the same as the incumbent network's hopping sequence, then one additional step 38 is taken.

In step 38, method 10 waits for the incumbent network to complete its use of the first channel in the incumbent network's hopping sequence, and then step 38 waits at least one additional time slot thereafter. Next, the flow continues to step 36 where, as introduced above, the newly-entering network begins communicating according to its newly-developed hopping sequence. From the preceding, it should now be appreciated that if the newly-entering network uses essentially the same hopping sequence as the incumbent network, then the delay imposed by step 38 permits each packet transmitted by the newly-entering network to essentially occur at least two time slots later than a corresponding packet from the incumbent network and in the same channel. As a result, both networks use essentially the same hopping sequence (i.e., the newly-entering network hopping sequence being further modified so as to avoid fixed interference), but step 38 effectively causes the newly-entering network to lag in time behind the incumbent network. This lag, therefore, will prevent collisions between packets from the two networks since the incumbent network will always be at least two time slots ahead of the same channel usage by the newly-entering network.

Figure 3:
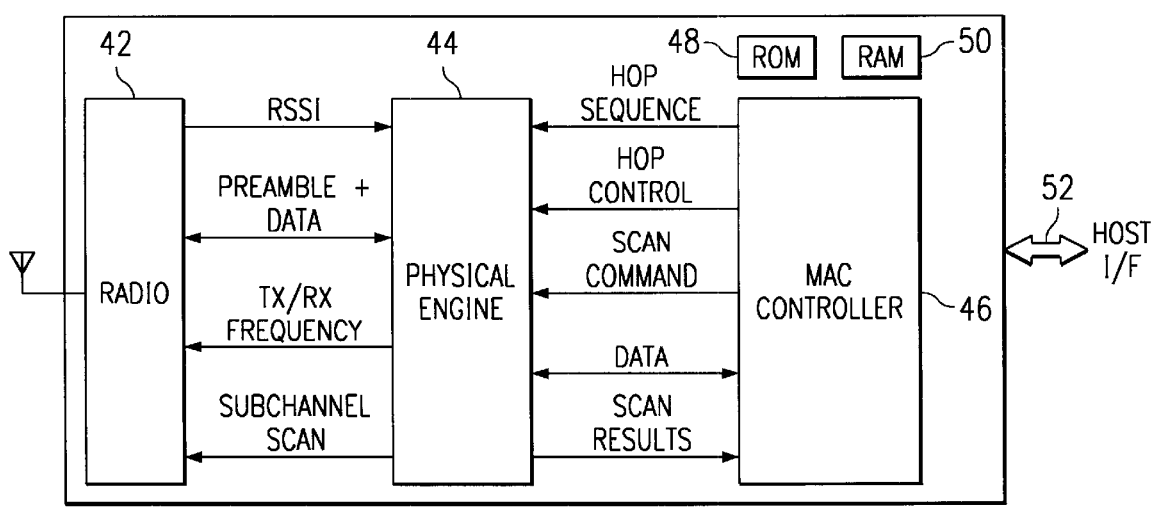
FIG. 3 illustrates a block diagram of a network transceiver operable to perform the method shown in FIG. 2.

FIG. 3 illustrates a block diagram of a network transceiver 40 operable to perform method 10 shown in FIG. 2, and which is shown here by way of example. In general, transceiver 40 includes three primary operational blocks, namely, a radio 42, a physical engine 44, and a media access control ("MAC") controller 46, all of which are standard in the wireless local area network ("LAN") art, and which are also described in the IEEE 802.11 standard for wireless LANs. In addition to the prior art functions of these blocks, however, they also are operable to perform the steps of method 10 from FIG. 2. To the extent these blocks perform functions beyond those in method 10, such functions are ascertainable by one skilled in the art and are not detailed here. Further, note that the blocks of FIG. 3 are shown by way of example to depict certain functions, while one skilled in the art may assign those functions to different blocks and also may select from various different circuits for accomplishing these functions. Also for sake of some completeness, transceiver 40 also includes an indication of a read only memory ("ROM") 48, a random access memory ("RAM") 50, and a host interface 52, as these additional aspects may well be expected by one skilled in the art to be included with a transceiver, although such extra devices need not be detailed in connection with the operation of transceiver 40 relative to method 10. Lastly, the three primary blocks of transceiver 10, as well as the signals shown between those blocks, are discussed below in an order that parallels the steps of method 10 discussed earlier.

To commence method 10, MAC controller 46 asserts the Scan Command signal to physical engine 44. In response and to accomplish steps 16 through 24, physical engine 44 selects a channel and indicates the selected channel to radio 42 by the TX/RX Frequency signal. In response, radio 42 adjusts (e.g., its oscillator) to examine the signal at the indicated frequency and, recall in the preferred embodiment, an RSSI measurement is made at this frequency. Further in this regard, recall that it is discussed above that the preferred embodiment evaluates sub-channels within each selected scanned channel to determine if detected interference, if any, is either fixed interference or packet interference. Accordingly, physical engine 44 may indicate each such sub-channel to radio 42 via the Subchannel Scan signal or may indicate by that signal that sub-channels should be evaluated for the channel specified by the TX/RX Frequency signal; alternatively, radio 42 may be set up to evaluate a certain number of sub-channels (e.g., ten) for each channel indication it receives from physical engine 44. In any event, as radio 42 sweeps across sub-channels and determines corresponding RSSI measurements, it returns each measurement via the RSSI signal shown from radio 42 to physical engine 44. In response to the RSSI measurements, physical engine 44 makes the determinations of step 18 (i.e., whether interference is fixed) and step 22 (i.e., whether interference is from a packet), and potentially responds by taking the actions of steps 20 and 24, respectively. In addition, if RSSI is zero or negligible for a given scanned channel, then the preferred embodiment determines that there is no interference on that channel. In any event, once a channel is evaluated, physical engine 44 achieves step 28 by adjusting the TX/RX Frequency signal to the next channel (or subchannel within the next channel) to be scanned, and the process repeats for all channels. Finally, once all channels are selected, the results of all detected interference are reported by physical engine 44 to MAC controller 46 via the Scan Results signal.

Once MAC controller 46 receives the Scan Results signal, it performs steps 30 and 32 directed to creating and modifying a new hopping sequence for the newly-entering network. Further, once this new hopping sequence is finalized, then MAC controller 46 communicates it to physical engine 44 via the Hop Sequence signal, and MAC controller 46 then instructs MAC controller 46 to actually begin hopping (i.e., transmitting per the new hop sequence) by asserting the Hop Control signal. This latter aspect, therefore, may be asserted to accommodate the delay aspect of step 38 if applicable.

From the above, it may be appreciated that the preferred embodiments provide various alternatives whereby a newly-entering network first scans the frequency channels along which it may transmit and in response to existing signals on those channels a hopping sequence is derived for the newly-entering network. The hopping sequence for the newly-entering network provides numerous advantages over the prior art. For example, packets transmitted according to the newly-entering network's derived hopping sequence are considerably less like to incur interference as opposed to a non-LBT prior art wireless network. Further in this regard, therefore, the preferred embodiments may be used with Bluetooth or other non-LBT protocols, thereby gaining access to the features of those protocols, while still having a reduced incidence of packet interference even without the LBT functionality. Indeed, this benefit is particularly useful given that Bluetooth may well become a very prevalent protocol and, for this reason, the preferred embodiment specifically contemplates a Bluetooth implementation. As another example, the preferred method does not require a delay associated with each individual packet transmission as does an LBT architecture. As still another example, recall that the FCC imposes a regulation on wireless networks in that they are not permitted to explicitly coordinate with one another, and the preferred embodiment satisfies this regulation while still achieving a reduced incidence of packet interference. As still another example, while the preferred embodiment has been discussed primarily in connection with the Bluetooth protocol, such discussion is by way of example and, thus, the above teachings may be applied to other systems as well (e.g., IEEE 802.11) and combination of several Bluetooth and 802.11 frequency hopping devices. Still further, the preferred embodiment may be used in numerous different wireless band systems (e.g., the ISM band, and others). Consequently, while the present embodiments have been described in detail, the preceding further demonstrates that various substitutions, modifications or alterations could be made to the descriptions set forth above without departing from the inventive scope which is defined by the following claims.

What is claimed is:

1. A method for determining a frequency hopping sequence for a newly-entering network, comprising the steps of:
   scanning a plurality of frequency channels, comprising the steps of:
     detecting whether a signal exists on each frequency channel; and
     recording information corresponding to each frequency channel on which said signal is detected; and
   responsive to the information, forming the frequency hopping sequence.

2. The method of claim 1 wherein the detecting step comprises detecting whether a packet signal exists on each channel on which the signal is detected.

3. The method of claim 2 wherein the packet signal exists on the channel in response to a packet communicated by an incumbent network along the channel on which the signal is detected.

4. The method of claim 3:
   wherein the detecting step comprises detecting an indication of a hopping sequence for the incumbent network and corresponding to the packet communicated by the incumbent network; and
   wherein the recording step comprises recording the indication.

5. The method of claim 3 wherein the recording step comprises:
   recording an identifier of the channel on which the signal is detected; and
   recording a time indication corresponding to when the signal is detected.

6. The method of claim 3 wherein the detecting step further comprises detecting whether a fixed interference signal exists on the channel on which the signal is detected.

7. The method of claim 6 wherein the recording step comprises recording an identifier of the channel on which the fixed interference signal is detected.

8. The method of claim 7 wherein each of the steps of detecting whether a packet signal exists and detecting whether the fixed interference signal exists is responsive to a bandwidth of the signal on the channel.

9. The method of claim 7 wherein each of the steps of detecting whether a packet signal exists and detecting whether the fixed interference signal exists is responsive to a scan of a plurality of sub-channels of the channel.

10. The method of claim 7:
    wherein each packet communicated by the incumbent network has a known maximum duration; and
    wherein the step of detecting whether the fixed interference signal exists is responsive to scanning each of the plurality of frequency channels for a period of time which exceeds the maximum duration.

11. The method of claim 2:
    wherein the detecting step comprises detecting an indication of a hopping sequence for an incumbent network and corresponding to the packet signal communicated by the incumbent network;
    wherein the recording step comprises recording an indication; and
    wherein the recording step comprises:
      recording an identifier of the channel on which the signal is detected; and
      recording a time indication corresponding to when the signal is detected.

12. The method of claim 2 wherein the detecting step further comprises detecting whether a fixed interference signal exists on the channel on which the signal is detected.

13. The method of claim 12 wherein the recording step comprises recording an identifier of the channel on which the fixed interference signal is detected.

14. The method of claim 2 wherein the packet signal exists on the channel in response to one of either:
    a packet communicated by the incumbent network along the channel on which the signal is detected; and
    a packet communicated by the incumbent network along a channel adjacent to the channel on which the signal is detected.

15. The method of claim 1 wherein the detecting step comprises further detecting whether a fixed interference signal exists on the channel on which the signal is detected.

16. The method of claim 15 wherein the recording step comprises recording an identifier of the channel on which the fixed interference signal is detected.

17. The method of claim 1:
wherein the detecting step detects packet signals in response to packets communicated along the plurality of frequency channels by an incumbent network having an incumbent network hopping sequence; and
wherein the step of forming the frequency hopping sequence for the newly-entering network comprises forming the hopping sequence equal to the incumbent network hopping sequence.

18. The method of claim 17 and further comprising the steps of:
waiting until the incumbent network transmits a first packet along a first channel corresponding to a first channel in the incumbent network hopping sequence; and
after the waiting step, transmitting a packet with the newly-entering network according to the hopping sequence for the newly-entering network.

19. The method of claim 1:
wherein the detecting step detects packet signals in response to packets communicated along the plurality of frequency channels by an incumbent network having an incumbent network hopping sequence;
wherein the detecting step detects signals in response to fixed interference along at least one of the plurality of frequency channels; and
wherein the step of forming the frequency hopping sequence for the newly-entering network comprises:
forming a first hopping sequence equal to the incumbent network hopping sequence; and
forming the frequency hopping sequence for the newly-entering network by modifying the first hopping sequence to not include any one of the plurality of channels along which fixed interference is detected.

20. The method of claim 19 wherein the modifying step comprises selecting an alternative channel from a rotation of channels such that the selected alternative channel is used in the frequency hopping sequence for the newly-entering network in place of one of the plurality of channels along which fixed interference is detected.

21. The method of claim 20 wherein the rotation of channels comprise a plurality of interference-free channels in which the detecting step has not detected a signal existing on each of the interference-free channels.

22. The method of claim 1:
wherein the scanning step is operable to identify packet signals in response to a hopping sequence of an incumbent network;
wherein the hopping sequence of the incumbent network consists of an integer number N of different channels along which the incumbent network may transmit packets;
wherein the step of scanning a plurality of frequency channels comprises scanning each of the plurality of frequency channels multiple times; and
wherein for each of the multiple times each of the plurality of frequency channels is scanned for a period no greater than a ratio of one over the integer N.

23. The method of claim 1:
wherein the scanning step is operable to identify packet signals in response to a hopping sequence of an incumbent network;
wherein the hopping sequence of the incumbent network consists of an integer number M of sequence channels over which the incumbent network is operable to transmit packets before repeating the hopping sequence of the incumbent network; and
wherein the step of scanning a plurality of frequency channels comprises scanning each of the plurality of frequency channels for a period at least equal to a time required by the incumbent network to transmit packets along the integer number M of sequence channels.

24. A method for determining a frequency hopping sequence for a newly-entering network, comprising the steps of:
scanning a plurality of frequency channels, comprising the steps of:
detecting whether a signal exists on each frequency channel; and
recording information corresponding to each frequency channel on which said signal is detected; and
responsive to the information and without negotiating with a preexisting user, forming the frequency hopping sequence.

25. A method for determining a frequency hopping sequence for a newly-entering network, comprising the steps of:
scanning a plurality of frequency channels, comprising the steps of:
detecting whether a signal exists on each frequency channel; and
recording information corresponding to each frequency channel on which said signal is detected; and
responsive to the information and without negotiation, forming the frequency hopping sequence on unused frequency channels.

* * * * *